United States Patent
Veronesi et al.

[11] Patent Number: 5,252,875
[45] Date of Patent: Oct. 12, 1993

[54] INTEGRAL MOTOR PROPULSOR UNIT FOR WATER VEHICLES WITH PLURAL ELECTRIC MOTORS DRIVING A SINGLE PROPELLER

[75] Inventors: Luciano Veronesi; James A. Drake, both of O'Hara Township, Allegheny County, Pa.

[73] Assignee: Westinghouse Electric Corp., Pittsburgh, Pa.

[21] Appl. No.: 676,400

[22] Filed: Mar. 28, 1991

Related U.S. Application Data

[63] Continuation-in-part of Ser. No. 571,970, Aug. 23, 1990, Pat. No. 5,220,231.

[51] Int. Cl.⁵ .................. H02K 16/00; H02K 7/14; H02K 7/08
[52] U.S. Cl. ............................ 310/114; 310/90; 310/67 R; 440/6
[58] Field of Search ................ 440/6, 38; 417/356; 310/67 R, 62, 63, 87, 112, 114, 156

[56] References Cited

U.S. PATENT DOCUMENTS

| | | | |
|---|---|---|---|
| 1,071,042 | 8/1913 | Fuller | 417/356 |
| 1,996,195 | 4/1935 | Ferguson | 417/356 |
| 3,143,972 | 8/1964 | Smith et al. | 440/6 |
| 3,708,251 | 1/1973 | Pierro | 417/356 |
| 3,914,629 | 10/1975 | Gardiner | 310/87 |
| 3,938,913 | 2/1976 | Isenberg et al. | 417/356 |
| 4,139,790 | 2/1979 | Steen | 310/156 |
| 4,250,424 | 2/1981 | Sento et al. | 310/156 |
| 4,360,751 | 11/1982 | Arnold, Jr. et al. | 310/63 |
| 4,367,413 | 1/1983 | Nair | 310/87 |
| 4,459,087 | 7/1984 | Barge | 310/63 |
| 4,559,463 | 12/1985 | Kobayashi | 310/156 |
| 4,831,297 | 5/1989 | Taylor et al. | 310/87 |
| 4,876,492 | 10/1989 | Lester et al. | 310/63 |
| 5,078,628 | 1/1992 | Garis, Jr. | 440/6 |

FOREIGN PATENT DOCUMENTS

| | | | |
|---|---|---|---|
| 0167294 | 10/1983 | Japan | 440/6 |
| 0737652 | 6/1980 | U.S.S.R. | 417/356 |

OTHER PUBLICATIONS

D. W. Brown et al, "Submersible Outboard Electric Motor/Propulsor", *Navel Engineers Journal,* Sep. 1989, pp. 44–52 (sent with Applicants' petition to rescind).
Brochure of Jastram-Werke GmbH KG entitled "Jastram Forschung-From the Idea to the Marketable Product" dated Aug. 1988.

*Primary Examiner*—Steven L. Stephan
*Assistant Examiner*—C. LaBalle

[57] ABSTRACT

The submersible propulsor unit of the invention comprises a cylindrical shroud having a water inlet and a water outlet, a propeller having a hub rotatably mounted within the shroud on a shaft, and an electric motor for driving the propeller that includes a rotor mounted around the periphery of the propeller, and a stator circumscribing the shroud, and a bearing assembly that includes means for circulating ambient water around the bearing surfaces to both lubricate and cool them. A stationary cover is detachably secured over the bearing assembly on the water inlet end of the shaft to provide easy access to the bearings in the bearing assembly The vane members that concentrically mount the shaft within the interior of the shroud are, in one embodiment, all connected on the downstream side of the propeller to reduce the cavitation and resulting noise when the propeller rotates. The magnetization of the rotor is provided by a plurality of permanent magnets for both improved efficiency, and lower noise. A squirrel cage structure formed from damper bars and conductive wedges is integrated over the magnets of the rotor both to assist in the starting of the motor, as well as to insulate the magnets from harmonic currents that could act to de-magnetize them. In one embodiment, the propulsor unit has a single propeller driven by two identical side-by-side motor assemblies. This arrangement provides added reliability while retaining mechanical simplicity and low cost and weight as compared with a multipropeller propulsor unit.

17 Claims, 8 Drawing Sheets

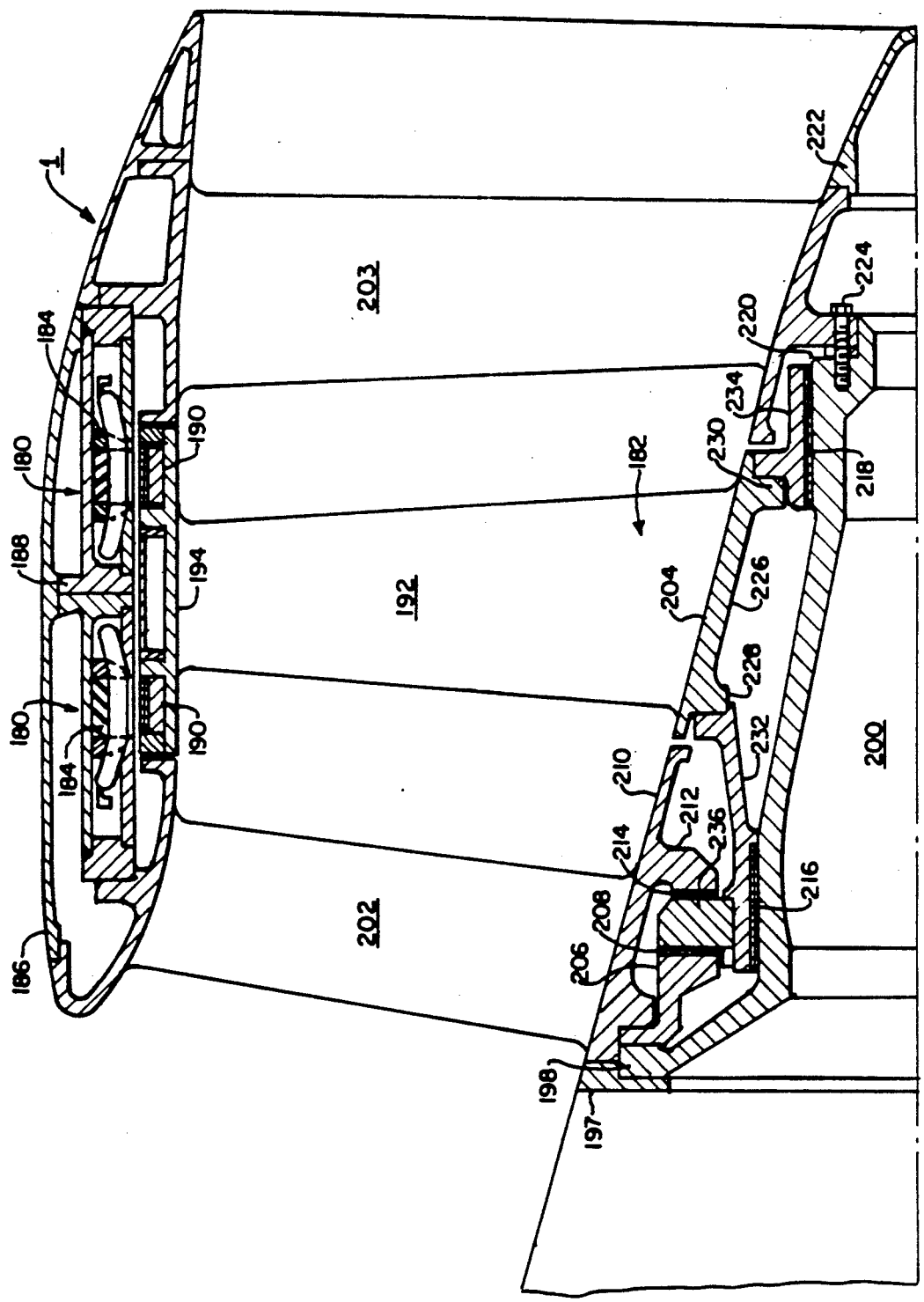

INTEGRAL MOTOR PROPULSOR UNIT FOR WATER VEHICLES WITH PLURAL ELECTRIC MOTORS DRIVING A SINGLE PROPELLER

This application is a continuation-in-part application of U.S. patent application Ser. No. 07/571,970, filed Aug. 23, 1990 now U.S. Pat. No. 5,220,231.

BACKGROUND OF THE INVENTION

This invention relates to submersible propulsor units, and is specifically concerned with an improved integral motor propulsor unit for water vehicles that provides high thrust, low weight, low noise, and easy maintenance with a very high degree of reliability.

Electric motor type propulsor units for water vehicles are known in the prior art. While such propulsors may be used for surface vessels, they find their primary application as secondary drive units for submarines where reliability, control, and low noise emissions are at a premium. In the prior art, such propulsor units have typically comprised a "canned" or wet winding electric motor having an output shaft that is connected to a propeller. The motor is disposed either directly in front of or behind the propeller. Unfortunately, the fact that the "canned" motor is disposed either directly in front of or behind the flow of water generated by the propeller creates obstructions to fluid flow that tends to reduce the effective thrust that can be generated by these units. To reduce the thrust losses caused by this blockage, higher speed and smaller diameter motors were used. However, the high shaft speed results in high propeller cavitation, which in turn generates a high level of unwanted noise.

To overcome these shortcomings, the Westinghouse Electric Corporation developed an integral motor propulsor unit that is disclosed and claimed in U.S. Pat. No. 4,831,297. This particular propulsor unit resembles a jet engine in structure and generally comprises a cylindrical shroud having a water inlet and a water outlet, a propeller having a hub rotatably mounted within the shroud on a shaft that is concentrically mounted within the shroud by a plurality of support vanes, and an electric motor for driving the propeller that includes an annular rotor mounted around the periphery of the propeller blades, and a stator that is integrated within the shroud of the unit. The advanced design of this particular prior art propulsor unit substantially increases the thrust output for a propulsor for a given weight and size while at the same time reducing the amount of noise generated due to the largely unencumbered flow of water that the propeller of the device can force through the fluid-dynamically shaped shroud. The quietness of the unit is further improved due to the noise-blocking characteristics of the shroud.

While the aforementioned integral motor propulsor unit represents a substantial advance in the art, the applicants have noted a number of areas in the design of this device which could bear improvement. For example, the water lubricated thrust and radial bearings periodically need to be replaced. To do this, the unit must be dry-docked. Additionally, if any of the components of the bearings need to be inspected or replaced, the location of these bearings necessitates an almost complete disassembly of the propulsor unit. The applicants have noted that the support vanes located upstream of the propeller can induce cavitation in the water surrounding the propeller during the operation of the propulsor, which in turn not only creates unwanted noise, but further impairs the efficiency of the unit. The applicants have also observed that the induction-type motor arrangement used in this particular prior art propulsor unit necessitates a very close spacing between the outer diameter of the rotor and the inner diameter of the stator if the electromagnetic coupling between the rotor and the stator is to be effectively implemented. However, such close spacing not only creates drag forces from the thin film of water that is disposed between the stator and the rotor; it also generates additional unwanted noises by increasing the magnitude of the harmonic currents flowing through the rotor (which are always present to some degree due to dissymmetries in the magnetic fields generated by the stator), which in turn cause the rotor to vibrate. The close spacing required between the inner diameter of the stator and the outer diameter of the rotor also creates an unwanted area of vulnerability in the propulsor unit should it be subjected to a high level of mechanical shock, or should sea water debris collect between the stator and rotor.

Additionally, unlike a water vessel powered by a conventional motor and screw arrangement, most maintenance operations on the motor of an integral propulsor unit can only be performed in dry-dock. This is particularly true where the integral propulsor unit is used as a primary drive unit, e.g., of a submarine. Thus, an integral motor-type propulsor unit with further improved reliability would be desirable, especially if such improved reliability could be achieved in a relatively simple, low cost and low weight design.

Clearly, there is a need for an improved, integral motor-type propulsor unit for use in submarines or other water vessels that has a bearing assembly which does not necessitate dry-dock procedures and which is relatively simple and easy to perform an inspection or a maintenance operation on. Ideally, such a propulsor unit would have lower noise characteristics than prior art units, and would incorporate a design which does not necessitate such close spacing between the rotor and stator in order to decrease the vulnerability of the unit in this region to mechanical shock or the collection of sea water debris. Additionally, there is a need for an integral motor-type propulsor unit having further improved reliability to avoid the necessity of repair operations that require the water vessel to be dry-docked.

SUMMARY OF THE INVENTION

The invention is an integral motor propulsor unit that obviates or at least ameliorates the aforementioned shortcomings associated with the prior art. In one aspect of the invention, the propulsor unit generally comprises a shroud having a water inlet and a water outlet, a propeller having a hub rotatably mounted within the shroud on a shaft, an electric motor for driving the propeller that includes a rotor mounted around the periphery of the propeller and a stator circumscribing the shroud, and a bearing assembly disposed between the hub of the propeller and the shaft that is both lubricated and cooled by the ambient water surrounding the unit. The bearing assembly may include an impeller mechanism to circulate a flow of lubricating and cooling water between the surfaces of the bearings. Moreover, the shaft may include one or more flow inlets located downstream of the propeller for providing a constant stream of lubricating and cooling water to the bearing assembly. These flow inlets may in turn be covered by a filter. The downstream location of these inlets helps to prevent debris entrained in the ambient water from entering the bearing assembly.

The bearing assembly may include both a thrust bearing disposed between the propeller hub and the upstream end of the shaft, and a radial bearing cartridge disposed around the inner circumference of the propeller hub for reducing the friction between these two components of the unit. The unit may further include a cover that is detachably mounted over the thrust bearing for facilitating access to both the thrust bearing and the radial bearing cartridge during a maintenance operation. The removable cover may be connected to the propeller hub and rotate along with the propeller during the operation of the unit, or it may be a separate component that is detachably secured on the inlet end of the shaft that remains stationary with respect to the rotating propeller. The stationary removable cover has the advantage of generating less noise during the operation of the propulsor unit. If desired, struts may be added between the stationary removable cover and the shroud for increasing the shock resistance of the unit.

A plurality of vane members connects the shaft of the unit to the inner surface of the shroud. In order to further reduce the amount of noise generated by the stream of water flowing through the shroud, in one embodiment these vane members are all connected to a portion of the shaft that is disposed between the hub of the propeller and the outlet end of the shroud. In addition to concentrically supporting the shaft within the shroud, the vane members cooperate with the blade of the propeller to increase the thrust generated by the propulsor unit.

The rotor of the AC motor used to drive the propeller of the unit may utilize permanent magnets instead of induction windings to create the necessary magnetic field within the rotor. The use of such permanent magnets not only increases the overall efficiency of the motor (since impedance losses through induction windings are eliminated), but further advantageously allows the spatial gap between the outer diameter of the rotor and the inner diameter of the stator to be increased without compromising good magnetic coupling between these components. Such an increase in gap size reduces fluid drag on the rotor and further reduces the strength of unwanted harmonic currents generated in the rotor by dissymmetries in the magnetic fields emanated by both the rotor and the stator, which in turn reduces vibrations in the rotor and results in smoother and quieter operation. This increase in gap size further reduces the probability of damage to the unit in this location due to the collection of sea water debris.

The rotor may further include a plurality of conductive damper bars over the outer peripheries of the permanent magnets for providing a squirrel cage structure that assists the rotor in achieving synchronization with the fluctuating magnetic fields emanated by the stator. These damper bars further insulate the magnets from demagnetizing currents such as the previously mentioned harmonic currents, or from currents caused by short-circuits in the unit. A pole cap may be disposed over each of the permanent magnets for housing the conductive damper bars and spacing them away from the magnet. Conductive wedges may be disposed between the permanent magnets in the rotor for increasing the current carrying capacity of the resulting squirrel cage structure. Finally, Stator slots are preferably skewed for additional noise reduction.

The aforementioned structural features results in a propulsor unit that is lower in weight, higher in power, and lower in noise generation than prior art propulsor units.

In a further aspect of the invention, a submersible propulsor unit with improved reliability is provided with a structure that is relatively simple and low in cost and weight. Such a propulsor unit comprises a shroud having a water inlet and a water outlet and a propeller means having a unitary hub and blade assembly mounted within the shroud on a shaft. At least two electric motors are provided for driving the propeller means. Each electric motor includes a rotor mounted around the periphery of the propeller means and a stator mounted within the shroud and spaced away from but magnetically coupled to said rotor. Also, a bearing assembly is provided having at least one bearing surface disposed between the hub of the propeller means and the shaft. By providing a propulsor unit with a single propeller powered by multiple motors, great reliability can be achieved without the added cost, complexity and weight which would result from providing complete propulsor unit redundancy or a multiple propeller propulsor arrangement.

Preferably, two identical motors are provided in a side-by-side spaced relationship to drive the propeller means and each motor is provided with independently operational means for connection to a power source, whereby the shut-down or malfunctioning of one motor will not significantly affect the functioning of the other motor.

In this embodiment of the invention it is desirable to provide two sets of vane members for supporting the shaft, one being located between the hub and the inlet end of the shroud, the other being located between the hub and the outlet end of the shroud. This provides additional structural integrity for the propulsor unit which is preferably increased in length (relative to a single motor propulsor) to accommodate the additional motor.

These and other objects and features of the present invention will be apparent and fully understood from the following detailed description of the preferred embodiments, taken together with the appended drawings.

BRIEF DESCRIPTION OF THE SEVERAL FIGURES

FIG. 10 is a simplified cross-sectional side view of a second alternate embodiment of the propulsor of the invention including two motor assemblies for driving a single propeller.

DETAILED DESCRIPTION OF THE PREFERRED EMBODIMENTS

Figure 1:
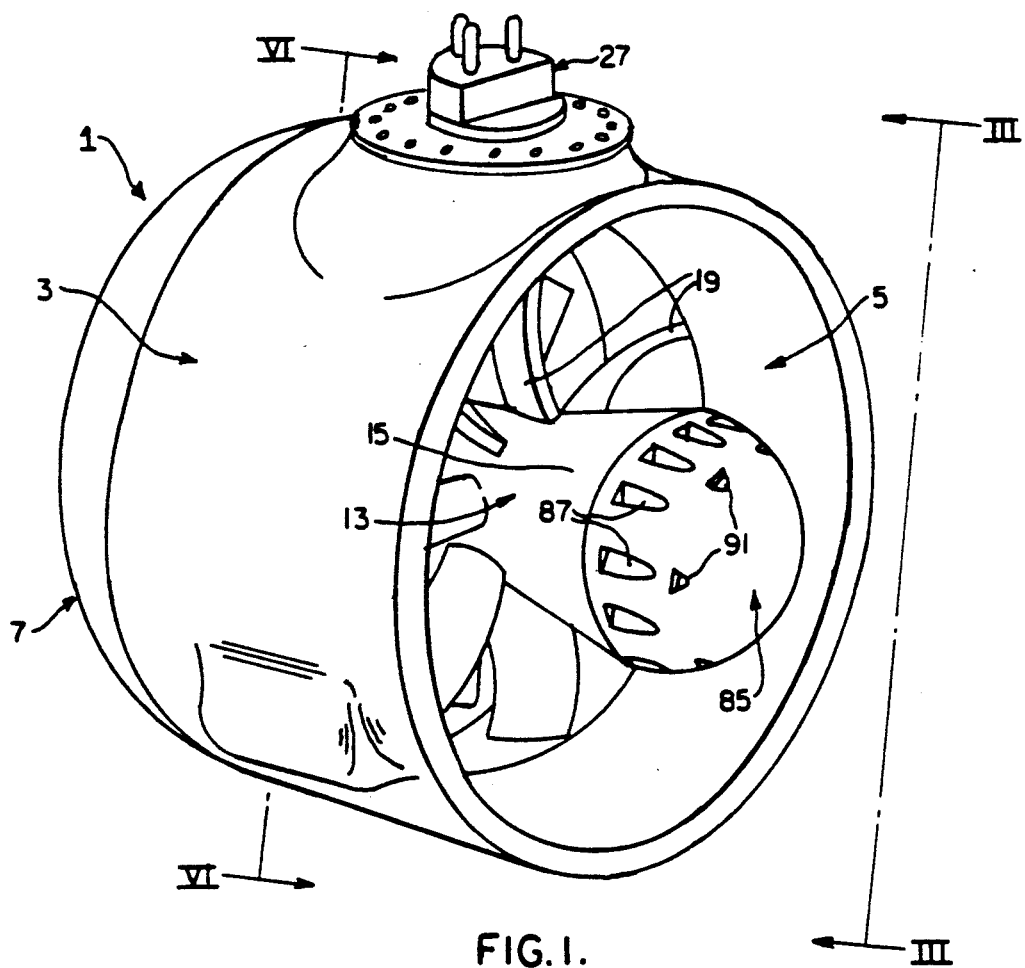
FIG. 1 is a perspective view of the propulsor unit of the invention.

With reference now to FIGS. 1, 2, 3, and 4, wherein like reference numerals designate like components throughout all the several figures, the propulsor unit 1 of the invention generally comprises a shroud assembly 3 having an inlet 5, and an outlet 7 whose interior is generally shaped like a Kort nozzle. A stationary shaft 9 is mounted along the axis of rotation of the interior of the shroud assembly 3 by a plurality of vane members 11. In addition to supporting the shaft 9 within the shroud assembly 3, the vane members 11, by virtue of their canted orientation (best seen with FIG. 4) further function to enhance the thrust generated by the propeller 13. A propeller 13 is disposed within the interior of the shroud assembly 3. The propeller 13 includes a hub 15 at its center which is rotatably mounted onto the stationary shaft 9 by means of a bearing assembly 17. The propeller 13 further includes a plurality of canted blades 19 whose inner ends are equidistantly mounted around the hub 15, and whose outer ends are connected to the rotor 23 of an electric motor 24 that is an integral part of the central portion of the shroud assembly 3. The electric motor 24 further includes a stator 25 disposed around the rotor 23 in a closely-spaced relationship. A stator terminal post assembly 27 is provided at the top end of the propulsor unit 1 for connecting the stator 25 of the unit 1 to a power source 28, which, in the preferred embodiment, is a variable frequency cyclo-converter.

Figure 5B:
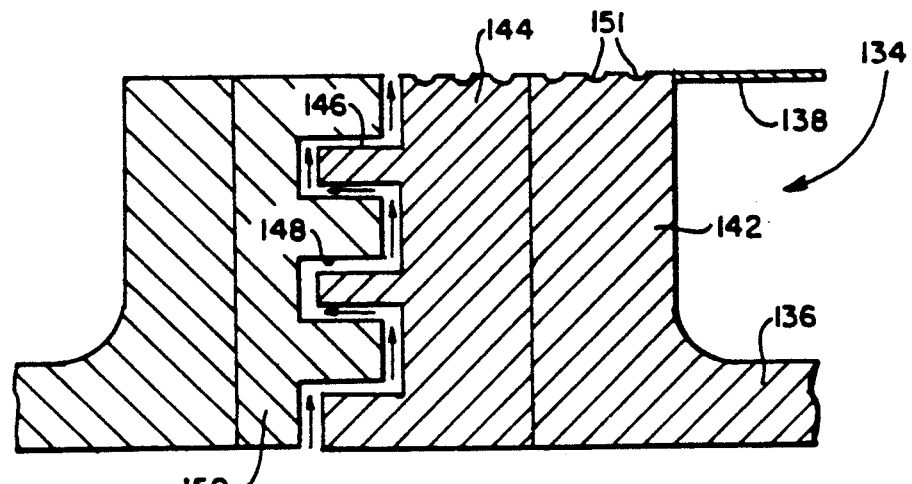
FIG. 5B is an enlargement of the circled area labeled 5B in FIG. 5A, illustrating how the crenulated surfaces of the rotor inlet ring and the stator inlet ring define a tortuous path between the stator and the rotor which helps to keep foreign particles from entering this space.
Figure 2:
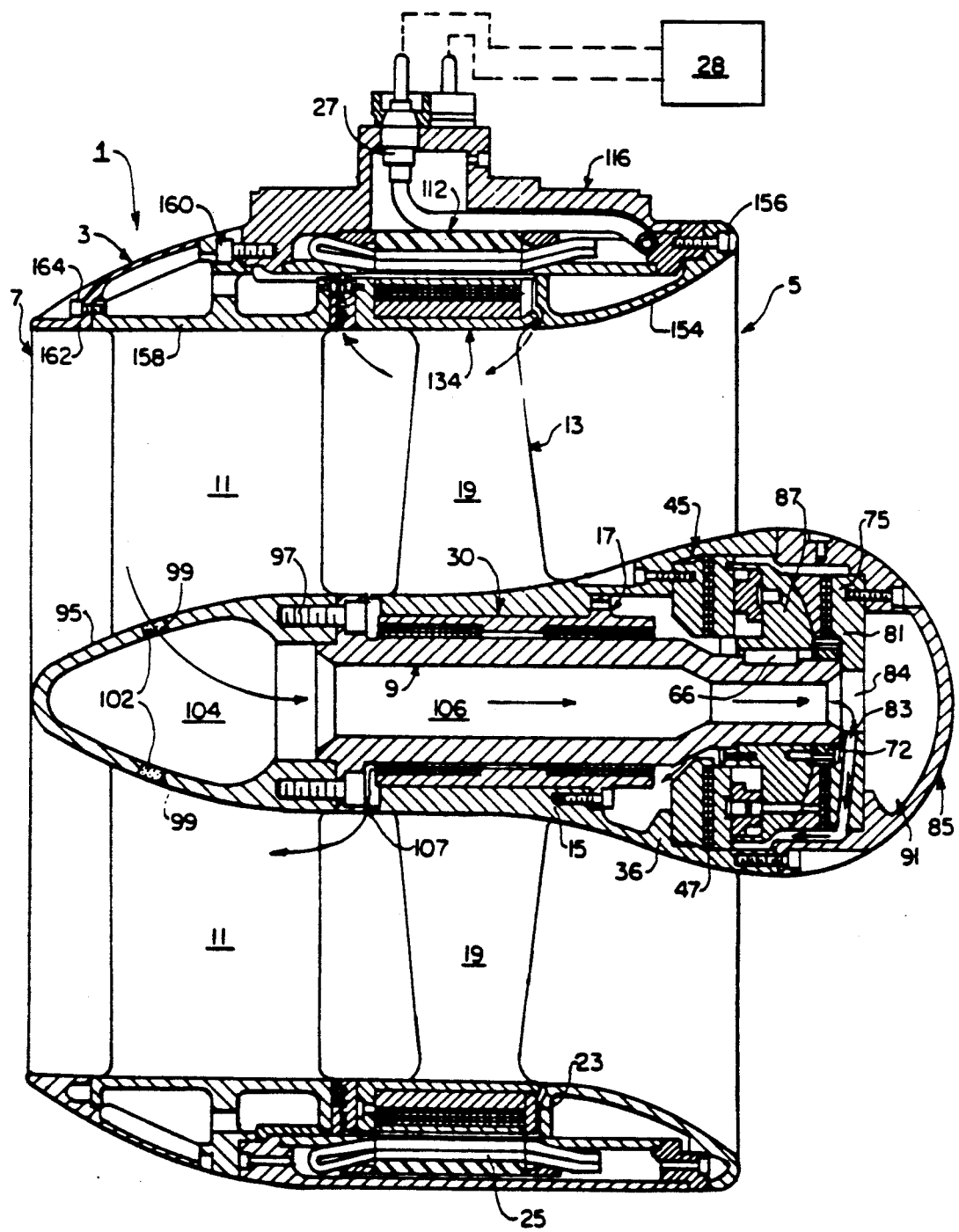
FIG. 2 is a cross-sectional side view of the propulsor unit illustrated in FIG. 1 along the line 2—2.
Figure 4:
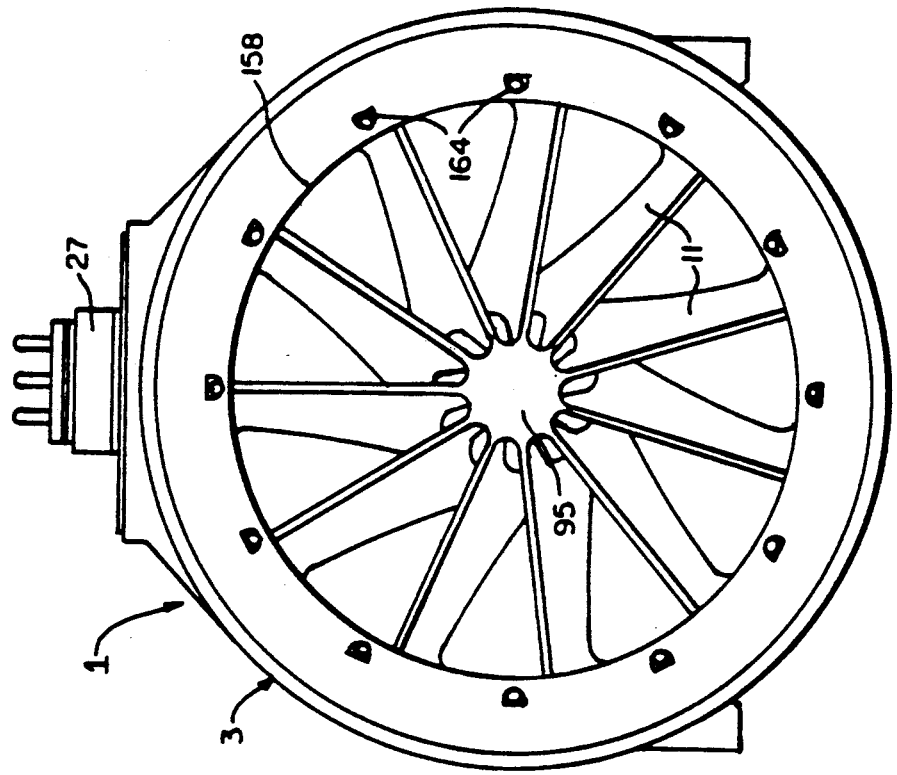
FIGS. 3 and 4 are front and rear views of the propulsor unit illustrated in FIG. 1, respectively.
Figure 3:
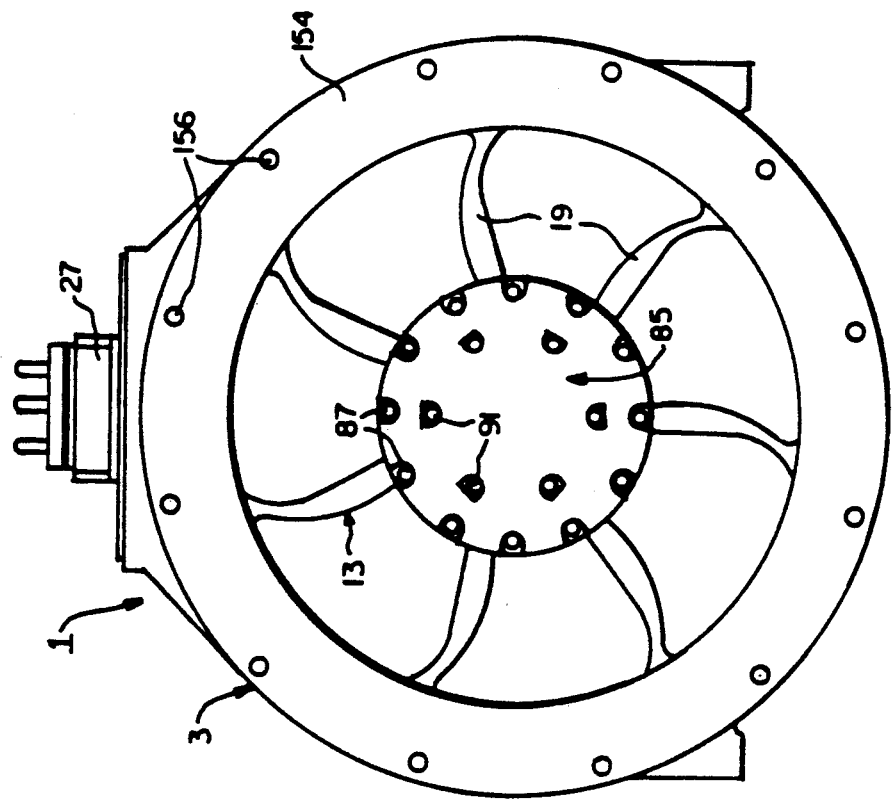
Figure 5A:
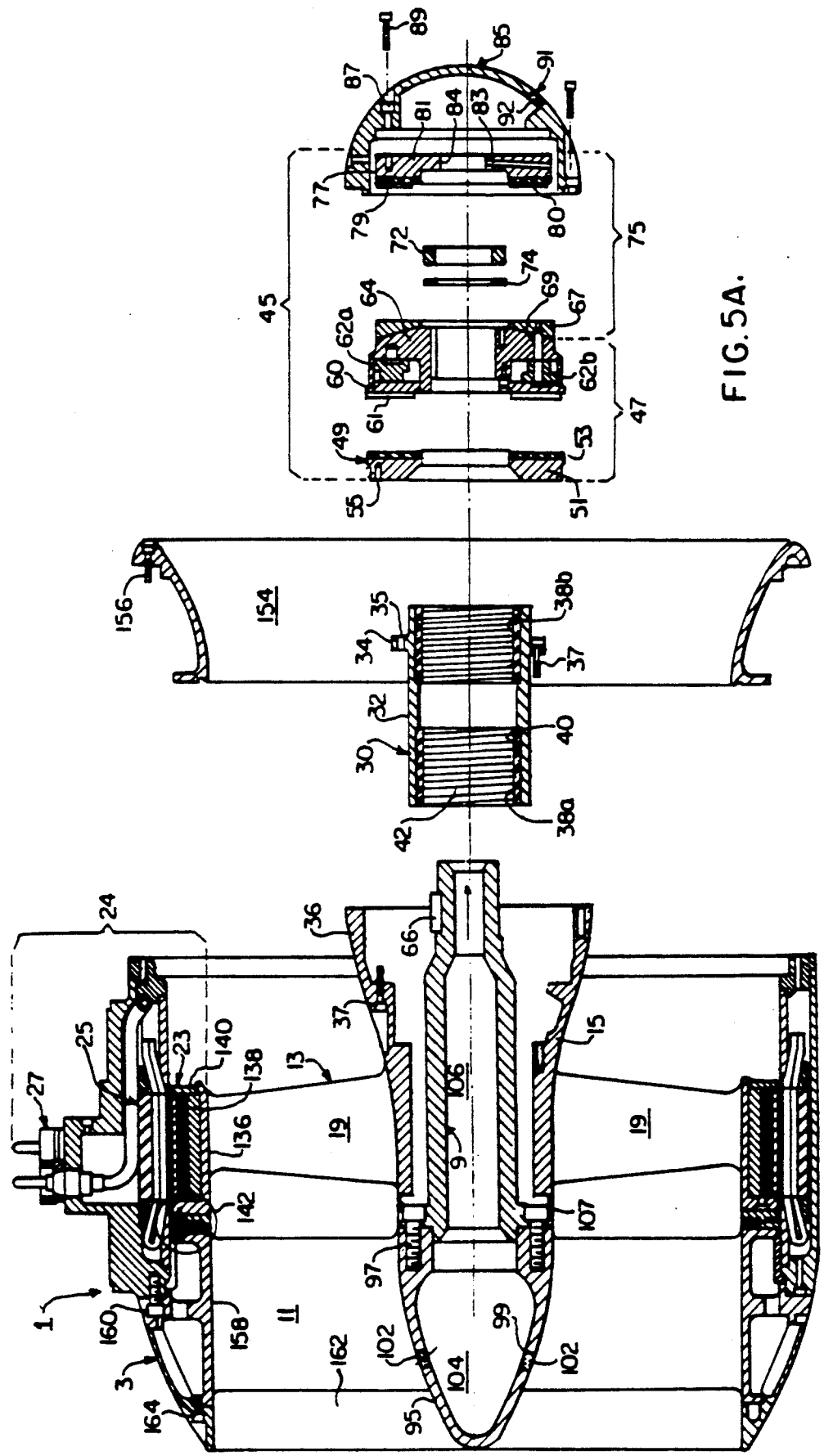
FIG. 5A is an exploded cross-sectional side view of the propulsor unit shown in FIG. 1 illustrating the various components of the bearing assembly disposed between the shaft of the unit, and the hub of the propeller.

With reference now to FIGS. 2 and 5A, the bearing assembly 17 of the propulsor unit 1 is provided with both a radial bearing cartridge 30, and a thrust bearing assembly 45 for minimizing friction between the propeller 13 and the shaft 9 both circumferentially and axially. With specific reference now to FIG. 5A, the radial bearing cartridge 30 includes a tubular bushing 32 preferably formed from Monel ®which is secured around the inner diameter of the hub 15 by means of a pair of bolt lugs 34, each of which includes a threaded bore 35. These threaded bores 35 are registrable with bolts 37 present in the flaired, upstream portion 36 of the hub 15. Of course, when these bolts 37 are secured into the position illustrated in FIG. 2, the tubular bushing 32 rotates along with the hub 15 relative to the stationary shaft 9. Further disposed around the inner diameter of the tubular bushing 32 are a pair of rubber bearing sleeves 38a,b.. These sleeves are disposed within annular recesses 40 present along the inner surface of the tubular bushing 32 which prevent axial movement between the bearing sleeves 38a,b and the tubular bushing 32. The inner diameter of each of the rubber bearing sleeves 38a,b includes a plurality of spiral grooves 42 which helps the bearing sleeves 38a,b to expel any foreign matter entrained within the sea water which constantly flows between these sleeves 38a,b and the shaft 9.

The thrust bearing 45 includes both a primary thrust bearing 47 which is designed to receive the axial load generated by the propeller 13 during the operation of the unit 1, as well as a secondary thrust bearing 75 designed to bear the substantially lighter load of a "windmilling" propeller 13 when the electric motor 24 is not in operation.

The primary thrust bearing 47 is provided with an annular runner 49 formed from a tilted annular pad 51 which supports an annular rubber ring 53. The tilted annular pad 51 is preferably formed from Monel ®. The tilted annular pad 51 and rubber ring 53 are secured onto the flaired, upstream portion 36 of the hub 15 by means of threaded bores 55 present in the pad 51, and bolts 57 mounted in the this portion 36 of the hub 15. The primary thrust bearing 47 further includes a bearing ring 60 which is stationarily mounted onto the non-rotating shaft 9 and which wipingly engages the annular rubber ring 53 of the runner 49 during the operation of the unit 1. A plurality of radially oriented grooves 61 are provided around the bearing ring 60 for both creating a lubricating film of sea water between the rubber ring 53 of the runner 49, and the ring 60. These grooves 61 serve the further useful purpose of facilitating a constant circulation of sea water between the runner 49 and the ring 60 which helps to reduce wear by dissipating heat generated by friction. The bearing ring 60 is connected to a plurality of link pin supports 62 a,b which in turn are secured into a support pad 64. The support pad 64 is in turn rigidly mounted onto the stationary shaft 9 by means of a key 66 which prevents the pad 64 from rotating relative to the shaft 9. A bumper plate 67 is mounted on the side of the support pad 64 opposite from the bearing ring 60 by means of a retaining stud 69. The bumper plate 67 has a concave face that engages a convex face on the support pad 64 that allows plate 67 to "wobble" slightly with respect to pad 64 in response to small degrees of off-centering between these two components. As we shall see presently, the bumper plate 67 forms a part of the secondary thrust bearing 75, even though it is mechanically integrated into the structure of the primary trust bearing 47. A lock nut 72, in combination with a lock nut washer 74 serves to axially and rigidly secure the support pad 64 onto the non-rotating shaft 9.

The secondary thrust bearing 75 is generally located upstream of the primary thrust bearing 47 and includes a runner 77 formed from an annular rubber ring 79. Like the previously discussed bearing ring 60, this annular rubber ring 79 includes grooves 80 for creating a thin film of sea water between the ring 79, and an annular support pad 81 which the ring 79 confronts. Preferably, the annular support pad 81 is likewise formed from Monel ®. To facilitate the circulation of sea water throughout the entire bearing assembly 17, the annular support pad 81 further includes a plurality of radially disposed impeller bores 83. The inner ends of the impeller bores 83 communicate with a central opening 84 disposed in the center of the pad 81. During the operation of the unit 1, the pad 81 acts as an impeller which forces a circulation of sea water through the various bearing surfaces within the bearing assembly 17.

At the upstream end of the shaft 9, a rounded, removable cover 85 is provided for preventing raw, unfiltered sea water from flowing through the bearing assembly 17. In this embodiment of the invention, the removable cover is affixed to the annular support pad 81 of the runner 77 of the secondary thrust bearing 75, and hence rotates with respect to the stationary shaft 9 when the motor 24 is in operation. To this end, the removable cover 85 includes a plurality of recessed bores 87 for receiving mounting bolts 89 which screw into threaded bores present around the upstream side of the annular support pad 81. A plurality of vent and flow bores 91 are present around the front of the removable cover 85 to allow enough of a flow of sea water through the cover 85 to prevent any pressure differentials from occurring which might impede the flow of sea water between the bearing surfaces present in the bearing assembly 17. Preferably, each of the vent and flow bores 91 includes a filter 92 for preventing foreign matter entrained in the sea water from entering the interior of the cover 85.

The fact that the entire bearing assembly 17 is secured into place by the removable cover 85, the lock nut and lock nut washer 72,74, the key 66, and mounting bolts 57 and 37 allows easy, frontal access to both the primary and secondary thrust bearing 47,75, as well as the radial bearing cartridge 30. Such easy, frontal access allows maintenance operations such as repair or placement of parts to be performed without the need for removing the entire propulsor unit 1 from the ship upon which it is mounted, or even for the ship to be dry-docked. This is a significant advantage, as the various components of the bearing assembly 17, no matter how well designed, are one of the most likely candidates for repair and replacement during the lifetime of the propulsor unit 1.

At the downstream end of the shaft 9, a vane hub 95 is provide which is connected to the inner ends of each of the previously-discussed vanes 11. Mounting bolts 97 secure the vane hub 95 to the downstream end of the stationary shaft 9. The vane hub 95 includes a plurality of flow ports 99 which are likewise covered by a filter material 102 to prevent foreign matter entrained in the surrounding sea water from entering the hollow interior 104 of the vane hub 95. As is evident in both FIGS. 2 and 5A, the hollow interior 104 of the vane hub 95 communicates with a centrally disposed bore 106 present in the stationary shaft 9.

The manner in which sea water circulates throughout the bearing assembly 17 may best appreciated with respect to FIG. 2. As is indicated by the flow arrows, ambient sea water flows through the downstream flow ports 99 and through the filter material 102, and from thence through the hollow interior 104 of the vane hub 95 and through the centrally disposed bore 106 in the shaft 9. From there, this water flows through the central opening 84 of the pad 81, and through the plurality of impeller bores 83. The centrifugal force imparted to the sea water that flows through the impeller bores 83 creates a pressurized flow of water which exits the outer ends of the bores 83, and flows back along the outer periphery of the support pad 64 of the primary thrust bearing 47, and from thence between the grooves of the bearing ring 60 and on through the central opening present in the runner 49 of the primary thrust bearing 47. From there, this sea water flows in between the rubber bearing sleeves 38a,b and the outer surface of the stationary shaft 9, whereupon it is discharged out through a radial opening 107. While some flow of sea water can occur through the previously-mentioned vent and flow bores 91 present in the removable cover 85, these bores 91 are dimensioned so as to be much smaller in cross-sectional area than the flow ports 99 present in the vane hub 95. Such dimensioning advantageously causes most of the water used to both lubricate and cool the various bearing surfaces of the bearing assembly 17 to be pulled into the unit 1 from the downstream end, which, along with the presence of the filter material 102 in the flow ports 99, helps to discourage the entry of foreign matter entrained in the sea water into the centrally disposed bore 106 in the shaft 9.

Figure 7:
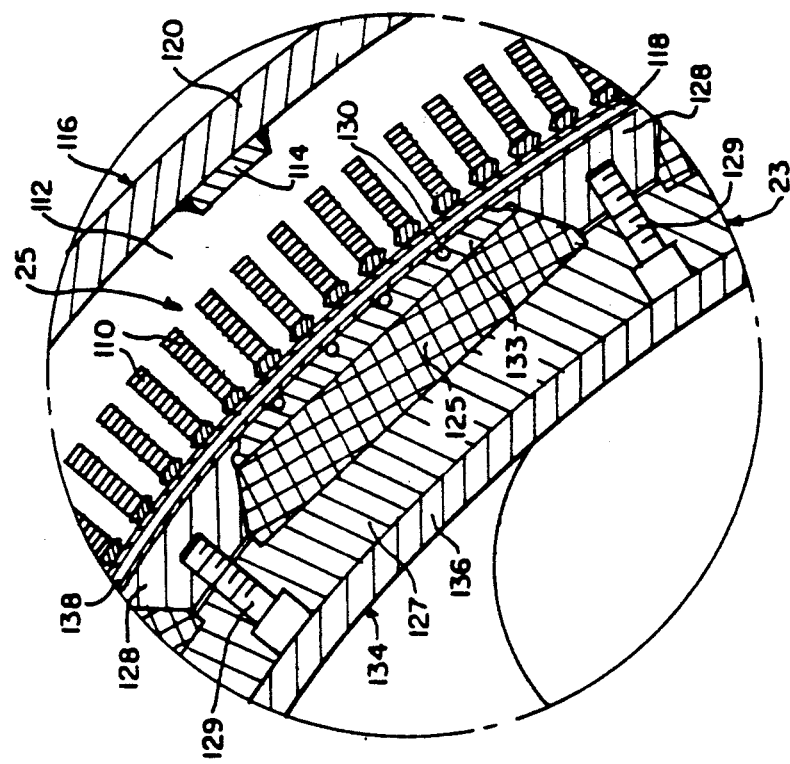
FIG. 7 is an enlargement of the circled area labeled "7" in FIG. 6, illustrating the details of the structure of both the stator and the rotor.
Figure 6:
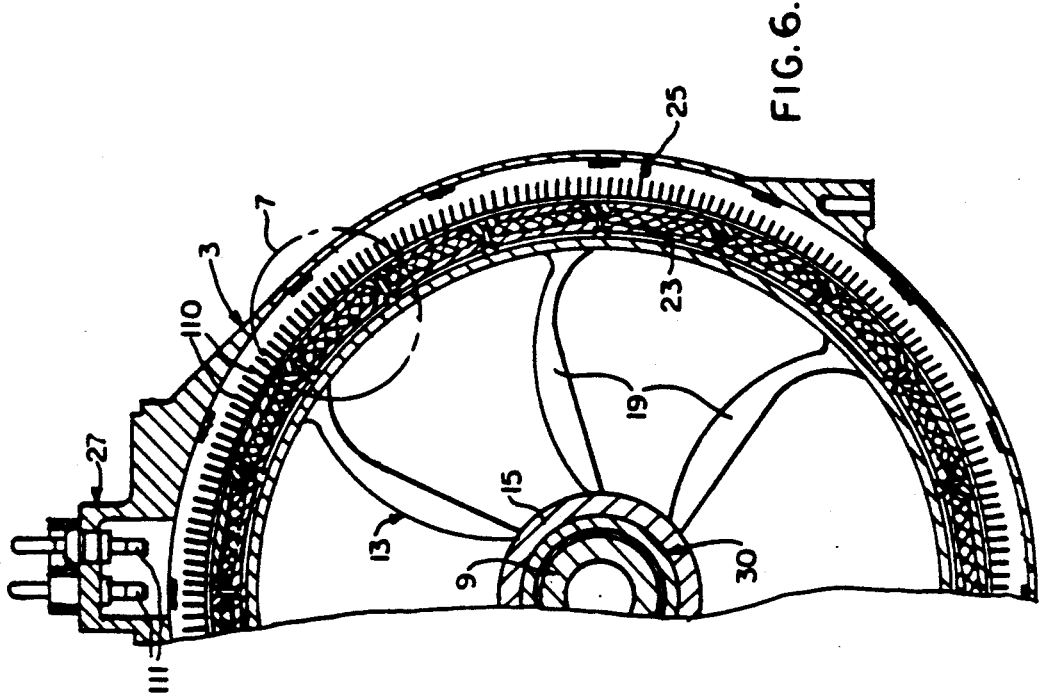
FIG. 6 is a front cross-sectional view of the propulsor unit illustrated in FIG. 1 along the line 6—6.

FIG. 6 and 7 illustrate the details of the electric motor 24 used to power the propeller 13 of the unit 1. As has been indicated earlier, the electric motor 24 is an alternating current motor that generally consists of a rotor 23 mounted around the periphery of the blades 19 of the propeller 13 that is in turn closely surrounded by a stator 25 which is "canned" within the shroud assembly 3. In the preferred embodiment, the a.c. motor 24 is preferably of the permanent-magnet type. While an induction-type a.c. motor might also be used, a permanent-magnet type a.c. motor is preferred for two reasons. First, a permanent-magnet motor provides about 10 percent better efficiency over an induction-type motor. Secondly, this higher efficiency can be realized with a somewhat larger spatial gap between the outer periphery of the rotor 23, and the inner periphery of the stator 25. In an operational propulsor unit 1, this larger gap may be as wide as 0.50 inches (or 1.31 centimeters), in contrast to a standard gap of 0.25 inches or less. The use of a larger (as opposed to a smaller) gap advantageously reduces both the frictional losses between the rotor 23 and stator 25 which are caused by the turbulent film of sea water between these two components and further reduces the amount of noise generated at this particular location of the propulsor unit. Other advantages include the generation of smaller amounts of harmonic currents (caused by unwanted dissymmetries in the magnetic field generated by the stator windings), and consequent lower (as opposed to higher) vibrations caused by the interaction of such currents on the rotor 23. Vibrations caused by any off-center "wobble" of the rotor 23 as it rotates within the stator 25 are also reduced. Finally, the larger gap afforded by the use of permanent magnets in the motor 24 makes it less likely that the rotation of the rotor 23 within the stator 25 could be impeded or stopped by the introduction of foreign matter in this gap, and further renders the entire unit 1 more resistant to external shocks, as the unit 1 would be more tolerant to any shock-induced damage which tended to knock the rotor 23 off-center with respect to the stator 25. All these are significant advantages, particularly in the context of submarine applications.

As may best be seen with respect to FIG. 7, the stator 25 includes a plurality of uniformly spaced stator core windings 110. Each of these stator core windings 110 is ultimately connected to lead wires 111 of the terminal post assembly 27. Moreover, each of the stator core windings 110 is received within a slot present in a stator core 112 (not shown in FIG. 6 or 7, but shown in FIGS. 2 and 5A) formed from laminated magnetic steel rings for conducting the magnetic fields generated by the windings 110. A plurality of building bars 114 are welded around the outer diameter of the 112 for holding together the laminated rings which form the core 112. All of the components of the stator 25 are contained within a water-tight stator housing 116 formed from an inner wall 118, and an outer wall 120.

The rotor 23 of the electric motor 24 is formed from a plurality of trapezoidally-shaped magnets 125 mounted within a magnet housing ring 127 formed from carbon steel. Each of the magnets 125 is preferably formed from an alloy of NbBfe because of the excellent magnetic field capacity and B-H curve characteristic of this material. Each of the magnets 125 is maintained within the magnet housing ring 127 by zirconium-copper rotor wedges 128 secured to the ring 127 by means of bolts 129. In the preferred embodiment, about 20 such trapezoidally-shaped magnets 125 are incorporated within the rotor 23. Four damper bars 130 formed from solid copper rods are provided over the upper ends of each of the magnets 125. These damper bars 130 are disposed within recesses present in pole cap members 133 secured over the top ends of each of the magnets 125. The purpose of the damper bars 130 and the rotor wedges 128 is to protect the magnets 125 from any electrical currents harmonically induced into the top surface of the rotor 23 as a result of unwanted dissymmetries in the magnetic field created by the stator coil windings 110. More specifically, any such harmonic currents will be concentrated within the highly conductive damper bars 130 and rotor wedges 128, which in turn will harmlessly dissipate them. If the damper bar 130 and rotor wedges 128 were not present in the rotor 23, such harmonically-induced currents would flow directly through the bodies of the magnets 125, and ultimately de-magnetize them. Additionally, the combination of the damper bars 130 and the rotor wedges 128 forms a sort of squirrel-cage structure that facilitates the starting of the rotor 23.

With respect now to FIGS. 5A, 5B and 7, the rotor 23, like the stator 25, is "canned" within a water-tight housing 134. The rotor housing 134 includes an inner wall 136, an outer wall 138, a front wall 140, and a rear wall 142 (all of which may be seen in FIG. 5A). With specific reference now to FIG. 5B, a rotor inlet ring 144 is connected to the rear wall 142 of the rotor housing 134, and includes a crenulated rear wall 146 which is complementary in shape to a crenulated front wall 148 of a stator inlet ring 150 disposed in opposition to the rotor inlet ring 144. The complementary crenulations of the rear wall 146 and front wall 148 of the rotor and stator inlet rings 144,150 define a tortuous path for the ambient sea water which helps to prevent foreign particles entrained therein from entering the gap between the outer periphery of the rotor 23, and the inner periphery of the stator 25. Additionally, the outer periphery of the rotor 23 includes a plurality of spiral grooves 151 which help to circulate and flush any such foreign matter out of the gap between the rotor 23 and the stator 25. The flow path created by these spiral grooves 151 is illustrated by the flow arrows present in the upper portion of FIG. 2.

Turning now to the details of the shroud assembly 3 and FIGS. 2 and 5A, this assembly 3 includes a funnel-shaped inlet fairing 154 that is secured by mounting bolts 156 onto the upstream side of the stator housing 116. A vane mounting ring 158 secured onto the downstream side of the stator housing 116 by way of mounting bolts 160. An outlet ring 162 is in turn secured onto the downstream edge of the vane mounting ring 158 by bolts 164. It should be noted that the funnel-shape of the inlet fairing 154 and the frustroconical shape of the vane mounting ring 158 formed, in combination stator housing 116, a Kort nozzle profile which advantageously maximizes the thrust of the propeller 13 mounted within the interior of the shroud assembly 3.

Figure 8:
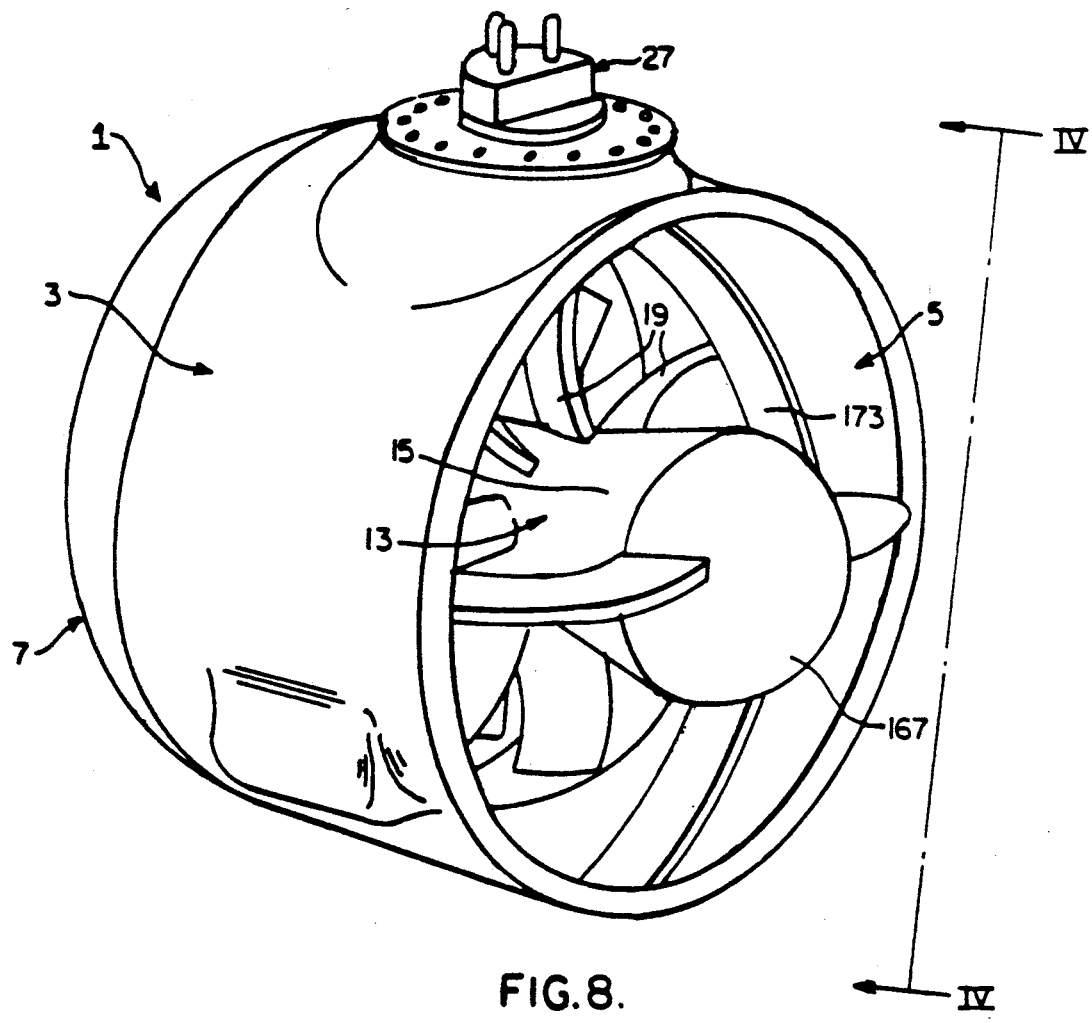
FIG. 8 is a perspective view of an alternate embodiment of the propulsor of the invention which has a stationary removable front cover, instead of a front cover which rotates with the hub of the propeller.
Figure 9:
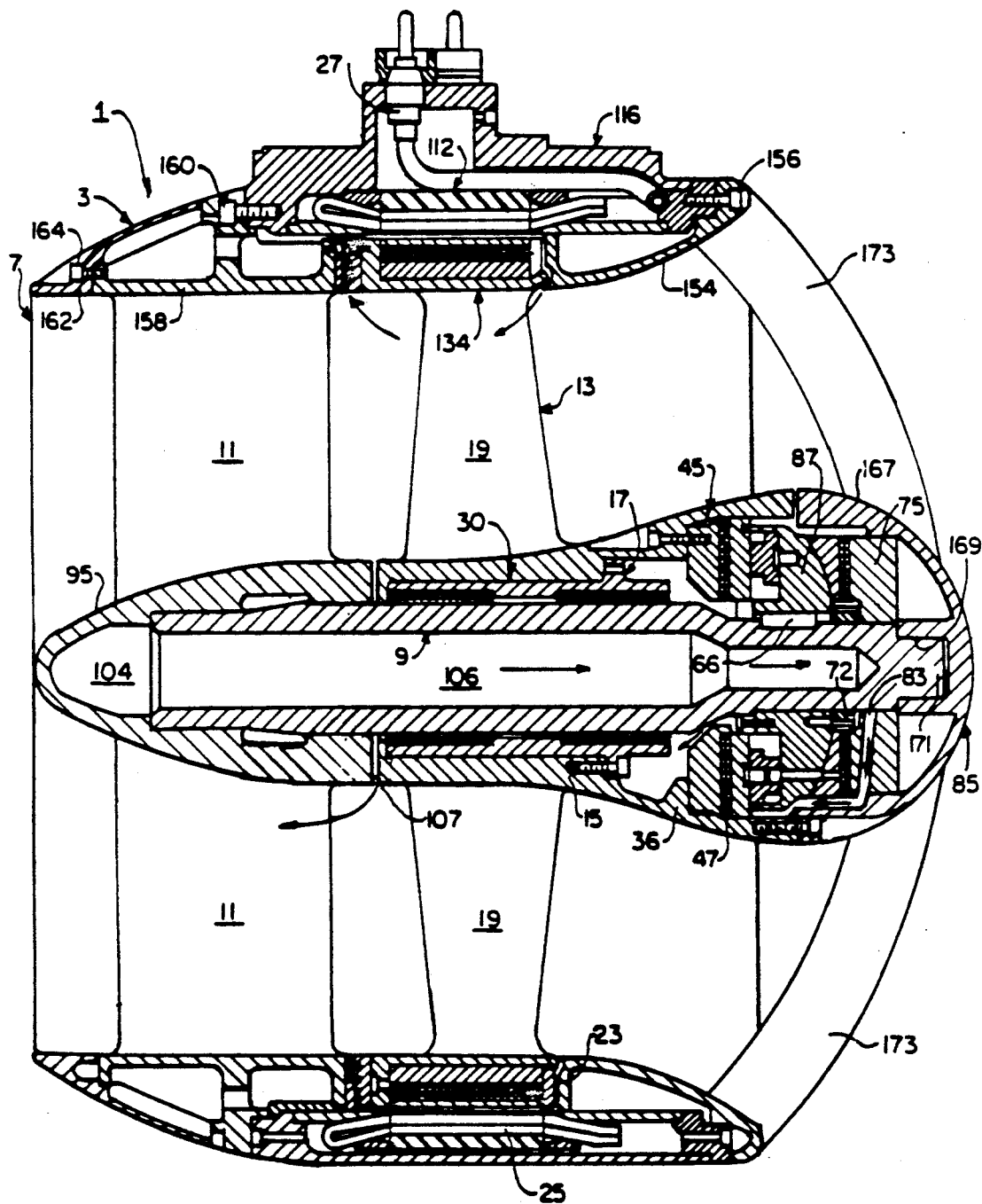
FIG. 9 is a cross-sectional side view of the propulsor unit illustrated in FIG. 8 along the line 9—9.

FIGS. 8 and 9 illustrate an alternate embodiment of the propulsor unit 1 of the invention. In contrast to the previously-discussed embodiment, the removable cover 167 of this alternate embodiment remains stationary with respect to the hub 15 of the propeller 13 in order to minimize the disturbances in the surrounding water that a rotating cover could create, which in turn could lower the efficiency of the propulsor unit 1, as well as generate unwanted noise. The removable cover 167 of this alternate embodiment includes a centrally disposed threaded recess 169 on its interior that may be screwed into a threaded stud 171 stationarily mounted on the upstream end of the non-rotating shaft 9. Additionally, this alternative embodiment may include a plurality of reinforcing struts 174 connected between the stationary removable cover 167, and the interior of the shroud assembly 3. These struts 173 increase the shock-resistance of the unit 1, which is an important consideration in submarine applications. With the exception of the stationary removable cover 167, the threaded stud 171 on the shaft 9 and the reinforcing struts 173, the alternate embodiment is in all material respects identical to the previously described first embodiment of the invention.

Improved reliability is especially important with integral motor propulsors of the type described herein. This is because inspection and repair of the motor in this type of propulsor, whether it be used as a secondary or primary drive unit is difficult if not impossible at sea and can be performed only with the water vessel in dry dock. By contrast, in a conventional ship or nuclear submarine, only the propeller is located outside the vessel, while the motor is located inside the vessel where it can easily be inspected and repaired. FIG. 10 illustrates a second alternate embodiment of the propulsor unit 1 of the invention having such improved reliability. In this embodiment, two identical motor assemblies 180 are provided to drive in a synchronous manner a single unitary propeller and hub assembly 182. Two identical stator core windings 184 are housed in shroud assembly 186 in a side-by-side spaced relationship with respect to each other. Shroud assembly 186 is, similar to shroud assembly 3 in the previous two embodiments, constructed of composite material and formed into a proper hydrodynamic shape for the propulsor. Shroud 186 also acts as a noise insulator to ensure quiet operation. Mating flanged members 188 are provided for housing stators 184 and securely fastening the respective stators together. Similarly, two identical rotors 190 are fixedly secured around the outer periphery of propeller 192 in a spaced parallel relationship by flanged member 194. The construction of each motor assembly 180 is substantially the same as in the previously described embodiments. However, the power output of each motor may be halved as compared with a single motor embodiment to achieve the same overall power output and just slightly greater weight.

Propeller 192 is constructed in the same manner as the previous embodiments, and is centered along an axial direction of the propulsor unit 1 between motor assemblies 180 in order to equalize the torques exerted on propeller 192 when the motors are operated simultaneously. Stator core windings 184 are connected to a power source (not shown) through leads (not shown) extending through one or both sets of vane members 202 and 203, independent of each other. Use of a common power source for both motors does not pose a reliability problem since such a power source will typically be located in an accessible area of the water vessel and will have built in redundancy. Of course, separate power sources could be utilized to power each motor.

However, in this case, it would be necessary to cross-connect the sources ensure that the sources are perfectly synchronized to properly energize the synchronous motor arrangement without inefficiency, noise or vibration.

The motors are physically isolated from one another within the shroud assembly 186 to minimize the possibility of one motor damaging the other in the event of a malfunction. Flanged members 188 form part of respective housings for separating in a water-tight manner stators 184 from each other. As a result, if a leak is developed which allows water to short one stator, the remaining stator will be kept dry and operational. Thus, should a malfunction occur in one motor, that motor can be shut down and the propeller can be driven by the remaining motor, albeit at half the power. This adds an extra degree of reliability over the single motor embodiments. At the same time, this particular embodiment of the invention is mechanically simpler, and lower in cost and weight as compared to complete propulsor redundancy or a multiple propeller propulsion unit. Additionally, in a multiple propeller propulsion unit, serious drag would be created by an inoperative propeller wind-milling under the influence of the flow created by the operative propeller or, worse yet, jamming up so as to create an immovable barrier to water flow.

By providing motor assemblies 180 as permanent magnet-type a.c. motors, as in the previous embodiments, the advantages described in connection with the previous embodiments are obtained. In the event one motor having this construction malfunctions or is shutdown, this motor will create a relatively small electromagnetic drag force reducing the power output of the propulsor (being powered by the remaining motor) by about 1-2%. On the other hand, if an induction-type (e.g., brushless exciter) a.c. motor construction is used, no such electromagnetic drag will occur once the voltage to the motor is cut.

Unlike the previous two embodiments which are illustrated in a form particularly suitable for use as a secondary drive unit, the exemplary dual motor embodiment of FIG. 10 is especially adapted for use as a primary drive unit on a submarine. More specifically, propulsor 1 of FIG. 10 is adapted to be attached to the trailing portion 196 of a submarine body to thereby form a tail portion of the submarine. Propulsor 1 is secured to a reinforced area 197 of submarine trailing portion 196 by known means such as a series of bolts extending into holes provided in a mating end flange 198 of propulsor 1.

An integral propulsor used as a primary drive unit will generally be much larger in power and size than one used merely to provide secondary propulsion. Whereas an outer maximum diameter of the propulsor 1 shown in FIGS. 1-9 may be 45 inches, the outer maximum diameter of a propulsor as shown in FIG. 10, suitable for a small submarine, may be 113 inches. The power output for a primary propulsor in accordance with the exemplary embodiment of FIG. 10 may be 600 hp (300 hp per motor). On the other hand, the power output of a secondary propulsor in accordance with FIGS. 1-9 may be only 325 hp.

A dual motor propulsor unit will tend to be longer than a single motor design due to the requirement of accommodating two motors and the desirability of spacing and thereby physically isolating the motors from each other along the axial direction of the propulsor. Due to the increased relative length of stationary shaft 200, it is desirable to provide extra support of shaft 200 by a set of vane members 202 extending between shroud 186 and a portion of the shaft between inlet 5 and propeller hub 204, in addition to a set of vane members 203 provided between outlet 7 and hub 204. Except as otherwise indicated, vane members 202 and 203 may be configured similar to vane members 11 in the previous embodiments.

Details of propeller hub 204, stationary shaft 200 and the bearing assembly rotatably connecting these elements are now described. Shaft 200 comprises a rigid hollow cylindrical body which tapers inwardly in a discontinuous manner from the point of attachment to submarine 196 (mating end flange 198). As already mentioned, a series of bolts or other known attachment means connects propulsor 1 to submarine trailing portion 196. This same series of bolts is used to connect to end flange 198, annular bearing cartridge 206 having a primary thrust bearing surface 208 and annular vane hub 210 which comprises an inwardly projecting flange 212 having thereon a secondary thrust bearing surface 214 spaced apart from and opposed to primary bearing surface 208.

Two radial bearing surfaces 216, 218 are provided on stationary shaft 200. These surfaces are parallel to the axis of rotation of propeller and hub assembly 182 and thus interrupt the inward taper of shaft 200. Bearing surface 216 is, in the exemplary embodiment, located radially inwardly of thrust bearing surfaces 208 and 214. Bearing surface 218 is located adjacent an opposite end portion 220 of shaft 200.

A conical end cap assembly 222, including a hub for vane set 203, is fixed to and remains stationary with shaft 200 via a series of bolts 224 extending into threaded holes provided in end portion 220.

Hub 204 is provided integral with propeller 192 and comprises a frustroconical ring member 226 fitted flush between vane hub 210 and end cap assembly 222. Circumferentially extending lugs 228, 230 are provided as means for attaching by bolts or other known means combined thrust and radial bearing cartridge 232, and radial bearing cartridge 234. Radial bearing cartridge 234 is provided with a bearing surface of rubber or the like which slideably engages bearing surface 218 on shaft 200. Combined thrust and radial bearing cartridge 232 comprises three bearing surfaces of rubber or the like for slidably engaging, respectively, thrust bearing surfaces 208, 214 and 216 associated with stationary shaft 200. Two thrust bearing surfaces are provided on cartridge 232 an opposite sides of a single thrust runner 236 extending between bearing cartridge 208 and flange 212. Thrust runner 236 is secured by known means to a portion of cartridge 232 just above the radial bearing surface which is provided in registry with radial bearing surface 216. While not specifically illustrated, suitable means should be provided for providing circulation of lubricating fluid such as ambient sea water to each of the four pairs of mating bearing surfaces.

The present invention is not limited to the specific embodiments described herein. The present invention encompasses propulsor units comprising various combinations of the features described with respect to the three embodiments. For example, the first and second embodiments can incorporate two motors in accordance with the third embodiment. As another example, the third embodiment may incorporate features of the bearing assembly of the first and second embodiments. Other modifications and embodiments within the scope and spirit of the invention will occur to those skilled in the art.

I claim:

1. A submersible propulsor unit, comprising:
 a shroud having a water inlet and a water outlet;
 a propeller means having a unitary hub and a single blade assembly rotatably mounted within said shroud on a shaft;
 at least two independently operable electric motors for driving said propeller means, each electric motor including a rotor mounted around the periphery of the single blade assembly of said propeller means and a stator mounted within said shroud and spaced away from but magnetically coupled to said rotor; and
 a bearing assembly having at least one bearing surface disposed between the hub of said propeller means and said shaft.

2. A submersible propulsor unit as defined in claim 1, further comprising a plurality of vane members connected between said shroud and said shaft for supporting said shaft along the axis of rotation of said propeller means, wherein at least one set of said vane members is connected to a portion of said shaft disposed between said hub and the outlet end of said shroud.

3. A submersible propulsor unit as defined in claim 2, wherein said bearing assembly includes both a thrust bearing and a radial bearing disposed between said shaft and said hub of said propeller means.

4. A submersible propulsor unit as defined in claim 3, wherein said shaft has an end that faces the inlet end of said shroud, and said hub of the propeller means is connected to said thrust bearing which transmits substantially all of the thrust said propeller means generates to said shaft end.

5. A submersible propulsor unit as defined in claim 2, wherein another set of vane members is connected to a portion of said shaft between said hub and the inlet end of said shroud.

6. A submersible propulsor unit as defined in claim 1, wherein said rotor of each motor includes permanent magnets for increasing the minimum distance required between the rotor and stator for efficient magnetic coupling and thereby reducing both drag losses and the noise generated by the propeller means.

7. A submersible propulsor unit as defined in claim 6, wherein said rotor includes damper bar means for protecting said magnets from spurious currents.

8. A submersible propulsor unit as defined in claim 1, wherein each rotor is fixedly secured with respect to each other rotor around the periphery of said propeller means in a spaced relationship.

9. A submersible propulsor unit as defined in claim 1, wherein each motor comprises independently operational means for connection to a power source, whereby shutdown or malfunction of one motor will not affect the functioning of another motor.

10. A submersible propulsor unit as defined in claim 1, wherein said at least two motors are identical to each other.

11. A submersible propulsor unit as defined in claim 1, wherein said propeller means is centered in an axial direction of the propulsor unit between said at least two motors.

12. A submersible propulsor unit as defined in claim 1, wherein said at least two motors are physically isolated from each other.

13. A submersible propulsor unit as defined in claim 1, wherein said at least two motors consists of two motors.

14. A submersible propulsor unit as defined in claim 1, further comprising attachment means for attaching the propulsor unit to a water vessel as a primary drive unit.

15. A submersible propulsor unit as defined in claim 14, wherein said propulsor unit is configured to form a tail portion of a submarine.

16. A submersible propulsor unit as defined in claim 1, wherein said hub and shaft are tapered inwardly from the water inlet to the water outlet.

17. A submersible propulsor unit, comprising:
 a shroud having a water inlet and a water outlet;
 a single propeller mans having a unitary hub and a single blade assembly rotatably mounted within said shroud on a shaft;
 two electric motors for driving only said single propeller means in order to enhance the operational reliability of the propulsor unit, each electric motor including a rotor mounted around the periphery of the single blade assembly of said single propeller means, the rotors of each of said motors being independently fixedly secured around separate portions of said periphery in a spaced apart relationship, and each motor having a stator mounted within siad shroud and spaced away from but magnetically coupled to its respective rotor, wherein each motor includes independently operational means for connection to a power source such that the shutdown or malfunction of one motor will not affect the functioning of another motor, and
 a bearing assembly having at least one bearing surface disposed between the hub of said propeller means and said shaft.

* * * * *